United States Patent
Wang

(10) Patent No.: US 10,845,894 B2
(45) Date of Patent: Nov. 24, 2020

(54) COMPUTER SYSTEMS WITH FINGER DEVICES FOR SAMPLING OBJECT ATTRIBUTES

(71) Applicant: Apple Inc., Cupertino, CA (US)

(72) Inventor: Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/390,521

(22) Filed: Apr. 22, 2019

(65) Prior Publication Data
US 2020/0174583 A1 Jun. 4, 2020

Related U.S. Application Data

(60) Provisional application No. 62/772,957, filed on Nov. 29, 2018.

(51) Int. Cl.
*G06F 3/0346* (2013.01)
*G06F 3/01* (2006.01)
*G06F 3/03* (2006.01)

(52) U.S. Cl.
CPC ............ *G06F 3/0346* (2013.01); *G06F 3/011* (2013.01); *G06F 3/016* (2013.01); *G06F 3/0304* (2013.01); *G06F 2203/0331* (2013.01)

(58) Field of Classification Search
CPC .......... G06F 3/014; G06F 3/016; G06F 3/017; G06F 3/011; G06F 2203/0331; G06F 3/0346; A63F 13/212; G06T 19/006
See application file for complete search history.

(56) References Cited

U.S. PATENT DOCUMENTS

| 7,352,356 | B2 | 4/2008 | Roberts et al. |
| 7,625,335 | B2 | 12/2009 | Deichmann et al. |
| 8,988,445 | B2 * | 3/2015 | Kuchenbecker ........ G06F 3/016 345/156 |
| 9,696,795 | B2 * | 7/2017 | Marcolina ............... G06F 3/011 |
| 9,817,489 | B2 | 11/2017 | Lor et al. |

(Continued)

FOREIGN PATENT DOCUMENTS

| JP | 2001104256 A | 4/2001 |
| JP | 2008171409 A | 7/2008 |

(Continued)

*Primary Examiner* — Koosha Sharifi-Tafreshi
(74) *Attorney, Agent, or Firm* — Treyz Law Group, P.C.; G. Victor Treyz; Kendall W. Abbasi

(57) ABSTRACT

A system may include electronic devices. The electronic devices may include finger devices configured to be worn on fingers of users and may include other electronic devices. The electronic devices may include sensors. A sensor may measure information on real-world-object physical attributes such as surface contours and textures associated with real-world objects. The measured physical attributes may be used to recreate a sampled physical object for a user in a computer-generated reality environment. During presentation of computer-generated content, visual content, audio content, haptic content, and/or other content may be presented that is based on measured visual, audio, haptic, and/or other physical attributes of a real-world object. Content may be presented using a head-mounted device, haptic devices and other output devices in finger devices, and/or other output devices.

23 Claims, 9 Drawing Sheets

(56) References Cited

U.S. PATENT DOCUMENTS

| | | | |
|---|---|---|---|
| 2008/0226134 A1* | 9/2008 | Stetten | G06F 3/016 |
| | | | 382/114 |
| 2009/0278798 A1* | 11/2009 | Kim | G06F 3/011 |
| | | | 345/158 |
| 2011/0213664 A1 | 9/2011 | Osterhout et al. | |
| 2013/0307875 A1 | 11/2013 | Anderson | |
| 2014/0104142 A1* | 4/2014 | Bickerstaff | G02B 27/017 |
| | | | 345/8 |
| 2015/0316985 A1 | 11/2015 | Levesque et al. | |
| 2016/0133230 A1 | 5/2016 | Daniels et al. | |
| 2016/0239080 A1 | 8/2016 | Marcolina et al. | |
| 2016/0278665 A1* | 9/2016 | Ferreira | A61B 5/0053 |
| 2017/0108930 A1 | 4/2017 | Banerjee et al. | |
| 2018/0356893 A1* | 12/2018 | Soni | G06F 3/0346 |
| 2019/0201785 A1* | 7/2019 | Heubel | G06F 3/016 |

FOREIGN PATENT DOCUMENTS

| | | |
|---|---|---|
| JP | 2014142751 A | 8/2014 |
| JP | 2015521303 A | 7/2015 |
| JP | 2015219887 A | 12/2015 |
| JP | 2016033815 A | 3/2016 |
| JP | 2016118929 A | 6/2016 |
| WO | 2012176610 A1 | 12/2012 |

\* cited by examiner

COMPUTER SYSTEMS WITH FINGER DEVICES FOR SAMPLING OBJECT ATTRIBUTES

This application claims the benefit of provisional patent application No. 62/772,957, filed Nov. 29, 2018, which is hereby incorporated by reference herein in its entirety.

FIELD

This relates generally to electronic systems, and, more particularly, to systems with electronic devices such as finger-mounted electronic devices.

BACKGROUND

Electronic devices such as computers can be controlled using computer mice and other input accessories. In computer-generated reality systems, force-feedback gloves can be used to control virtual objects. Cellular telephones may have touch screen displays and vibrators that are used to create haptic feedback in response to touch input.

Devices such as these may not be convenient for a user, may be cumbersome or uncomfortable, or may provide unrealistic output.

SUMMARY

A system may include electronic devices. The electronic devices may include finger devices configured to be worn on fingers of users and may include head mounted devices and other electronic devices. The electronic devices may include sensors. As a user interacts with a real-world object in the environment surrounding the user, one or more sensors may be sued to measure information on real-world-object physical attributes associated with the real-world object. The physical attributes that are measured may include attributes such as a surface contour, a texture, an object color or other visual attribute, a temperature, acoustic attributes, force-versus-distance characteristics, weight, and/or other physical attributes.

The measured physical attributes may be used to recreate the physical behavior of a portion of a sampled physical object for a user. For example, a sampled texture may be overlaid on a part of an object being presented in a computer-generated reality environment. During presentation of computer-generated content, visual content, audio content, haptic content, and/or other content may be presented that includes measured visual attributes, audio attributes, haptic attributes, and/or other sampled physical attributes of a real-world object. Content may be presented using a head-mounted device, haptic devices and other output devices in finger devices, and/or other output devices in the electronic devices.

DETAILED DESCRIPTION

Figure 1:
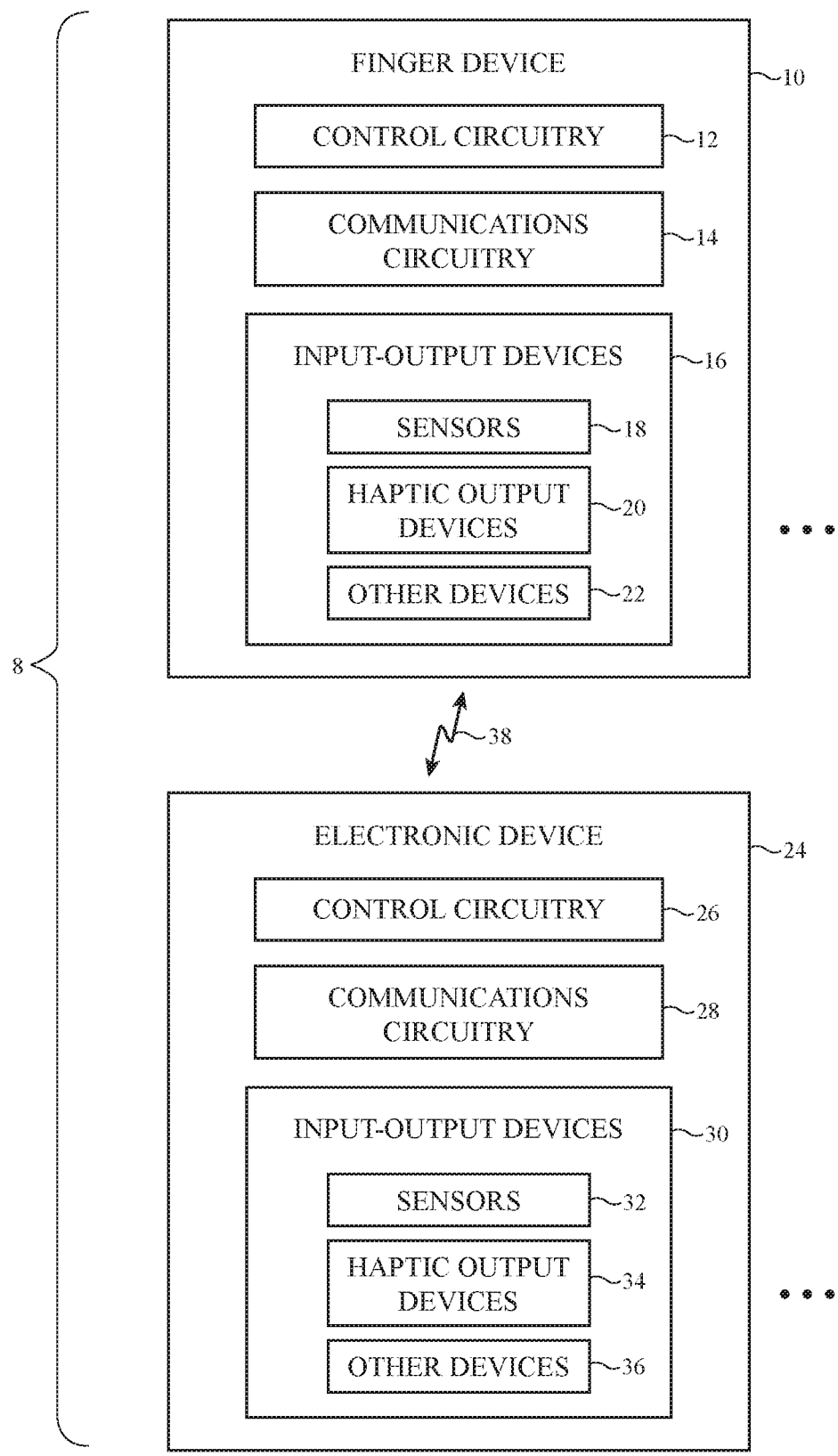
FIG. 1 is a schematic diagram of an illustrative system with electronic devices for making measurements on objects in a user's environment and in providing a user with output as a user interacts with virtual and real-world objects in accordance with an embodiment.

Electronic devices may be used to gather user input and to provide a user with output. For example, an electronic device may capture information on the physical attributes of real-world objects in an environment surrounding a user. Position sensors such as inertial measurement units and other sensors that can detect motion and location, force sensors, image sensors, and other sensors may be used in gathering measurements of real-world object physical attributes as a user interacts with the physical world. Samples of textures, visual patterns, measured objects shapes, and other real-world information can be gathered and stored. When using playback equipment such as a finger-mounted device, head-mounted device, and/or other electronic equipment, sampled real-world attributes can be provided to a user. Sampled real-world-object attributes may, for example, be provided to a user using haptic output devices, audio and visual output devices, and/or other output devices while a user interacts with real-world and computer-generated content.

An electronic system that allows a user to gather measurements of real-world-object physical attributes and that provides sampled attributes to a user may include electronic devices such as cellular telephones and computers. If desired, the electronic system may include wearable electronic devices that are configured to be mounted on the body of a user. For example, the electronic system may include devices that that are configured to be worn on one or more of a user's fingers. These devices, which may sometimes be referred to as finger devices or finger-mounted devices, may be used to gather input and supply output. A finger device may, as an example, include sensors that measure object surface shape and responses to applied pressure. The visual appearance and other physical attributes of real-world objects can also be measured using sensor circuitry in a finger device.

Wearable electronic devices such as head-mounted devices may also be used in measuring physical attributes of real-world objects. Sampled real-world object physical attributes can be played back to a user using wearable electronic devices as a user interacts with real and/or virtual objects. For example, a sampled real-world texture may be recreated using a haptic output component in a finger device as a user touches a real world object. Visual content such as sampled real-world visible attributes can also be provided to the user. For example, a display in a head-mounted device may be used to overlay a previously sampled surface appearance of a real-world object onto a different real-world object. Haptic output from a finger device or other equipment and visual output from a head-mounted device may, if desired, be provided to a user simultaneously and in coordination with each other as a user is interacting with real-world and virtual content.

If desired, other input may be gathered using one or more wearable electronic devices or other electronic devices and other output may be provided to a user while the user is using the electronic system. The use of a finger device to gather input and to provide corresponding haptic output and the use of a head-mounted display to display visual content for a user is illustrative.

During sampling a user may measure real-world-object physical attributes using one or more finger devices, head-mounted devices, and/or other electronic devices. These devices may also gather user input during operation of the system. During playback operations, an electrical system may provide the user with computer-generated content (sometimes referred to as virtual content) based on the sampled real-world object physical attributes and/or may provide the user with other computer-generated content. User input may be used in moving virtual objects and otherwise controlling system operations. If desired, the user may receive output from the electrical system while interacting with real-world objects. For example, haptic output corresponding to a previously sampled real-world object texture may be provided to a user while the user is touching a real-world object. In this way, a computer-generated version of a sampled real-world texture may be overlaid on a texture on a real-world surface and/or may replace a real-world texture associated with a real-world object that a user is touching. In some configurations, haptic output and other output may be supplied while a user's fingers are moving through the air without contacting any real-world objects.

Haptic output, visual output, audio output, and/or other output (e.g., heat, etc.) may be supplied by one or more devices in the electronic system. One or more devices may also be used in gathering user input. In some configurations, a user may use finger devices when using the electronic system to produce a computer-generated reality environment. This system may include one or more electronic devices that produce visual and audio output such as head-mounted equipment. Head-mounted devices may include glasses, goggles, a helmet, or other devices with displays and, if desired, speakers. During operation, finger devices may gather user input such as information on interactions between the finger device(s) and the surrounding environment (e.g., interactions between a user's fingers and the environment, including finger motions and other interactions associated with virtual content displayed for a user). The user input may be used in controlling visual output on the display. Corresponding haptic output may be provided during operation. This haptic output may include previously sampled real-world object physical attributes such as object shape, texture, response to pressure, etc. and may be provided to the user's fingers using the finger devices. Haptic output may be used, for example, to provide the fingers of a user with a desired texture sensation as a user is touching a real object or as a user is touching a virtual object. Haptic output can also be used to create detents and other haptic effects, to create force feedback that makes virtual objects that are hovering in space appear real to the touch.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's finger tips while leaving the user's finger pads exposed. This allows a user to touch objects with the finger pad portions of the user's fingers during use. If desired, finger devices may be worn over knuckles on a user's finger, between knuckles, and/or on other portions of a user's finger. The use of finger devices on a user's finger tips is sometimes described herein as an example.

Users can use the finger devices to interact with any suitable electronic equipment. For example, a user may use one or more finger devices to interact with an electronic system that supplies a computer-generated-reality environment. This equipment may include a head-mounted device with a display and, if desired, an associated host system such as a computer and/or cloud computing equipment that is accessed by the head-mounted display and/or cloud computing equipment that is accessed using the host system. Computer-generated-reality equipment may also include devices such as a tablet computer, cellular telephone, watch, ear buds, stylus, or other accessory, and/or other electronic equipment. In some systems, finger devices may be augmented or replaced by other electronic devices such as touch and/or force sensitive haptic-output gloves (sometimes referred to as computer-generated reality controller gloves), joysticks, touch pads, styluses, keyboards, computer mice, and/or other input-output devices.

FIG. 1 is a schematic diagram of an illustrative system of the type that may include one or more finger devices and/or other input-output devices for sampling real-world object physical attributes. As shown in FIG. 1, system 8 may include electronic device(s) such as finger device(s) 10 and other electronic device(s) 24. Each finger device 10 may be worn on a finger of a user's hand. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), a mouse, trackpad, stylus, ear buds, or other accessories, or equipment that implements the functionality of two or more of these devices.

Devices 24 may, if desired, include cloud-based computing equipment (e.g., one or more computers that are accessed over the Internet or other wide area network and/or over local area networks). Network communications paths may be wired and/or wireless. Cloud-based computers, which may sometimes be referred to as servers or online computers, may be used to store libraries of sampled real-world-object physical attributes and other shared and/or user-generated content. For example, a sampled texture from a given user may be uploaded to an online computer and subsequently downloaded for use by the computer-generated reality system of the user or another user.

In some arrangements, a single device 24 (e.g., a head-mounted device) may be used with one or more devices 10. In other arrangements, multiple devices 24 (e.g., a head-mounted device and an associated host computer or a head-mounted device, host computer, and online computer) may be used in system 8 with one or more devices 10. In yet other configurations, system 8 includes only one or more devices 10 (e.g., a head-mounted device, a cellular telephone, or a finger-mounted device, etc.). Configurations in which system 10 includes one or more devices 10 and one or more devices 24 may sometimes be described herein as an example.

With one illustrative configuration, device 10 is a finger-mounted device having a finger-mounted housing (finger device housing) with a U-shaped body that grasps a user's finger or a finger-mounted housing with other shapes configured to rest against a user's finger and device(s) 24 is a cellular telephone, tablet computer, laptop computer, wristwatch device, head-mounted device, a device with a speaker, or other electronic device (e.g., a device with a display, audio components, and/or other output components). A finger device with a U-shaped housing may have opposing left and right sides that are configured to receive a user's finger and a top housing portion that couples the left and right sides and that overlaps the user's fingernail.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., three-dimensional optical sensors such as structured light sensors configured to project dots of infrared light onto three-dimensional surfaces of real-world objects and sense three-dimensional shapes by capturing images of the dots using an infrared image sensor and/or optical depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, sensors that detect finger bending and other user movements, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and that optionally can be depressed to select items of interest). Alphanumeric keys and/or other buttons may be included in devices 16 and/or 30.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators, rotational actuators, actuators that bend bendable members (e.g., actuators that apply bending force across one or more joints in a finger), actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger pulp. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays. The displays may include, for example, a liquid crystal display, an organic light-emitting diode display, or other display with an array of pixels on which an image is displayed for a user. For example, device 24 and/or device 10 may include a display mounted on an exterior device face and/or in a viewable interior location that displays an image for a user. If desired, input-output devices 16 and/or 30 may include projector displays (projectors) that project images onto table tops or other external surfaces in the vicinity of the user. In this type of arrangement, a user may, as an example, view content that is being projected by a projector in device 10 and/or by a projector in device 24 onto the external surface while using device 10 to interact with the projected image. Input-output devices 16 and/or 30 may, if desired, include other input-output components such status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals. If desired, other devices 22 and 36 may include heating and/or cooling elements such as resistive heaters, thermoelectric cooling elements based on the Peltier effect, or other adjustable temperature sources.

Figure 2:
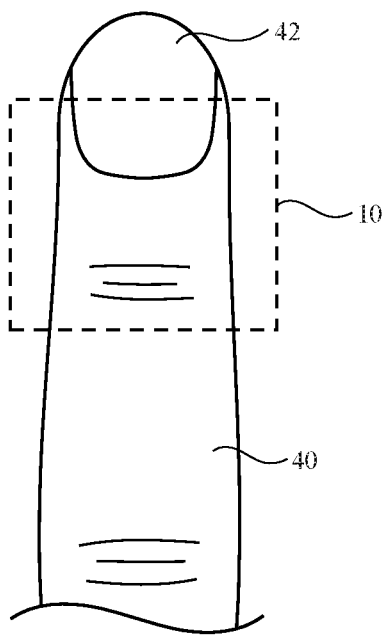
FIG. 2 is a top view of an illustrative finger of a user on which a finger device has been placed in accordance with an embodiment.

FIG. 2 is a top view of a user's finger (finger 40) and an illustrative finger-mounted device 10. As shown in FIG. 2, device 10 may be formed from a finger-mounted unit that is mounted on or near the tip of finger 40 (e.g., partly or completely overlapping fingernail 42). If desired, device 10 may be worn elsewhere on a user's fingers such as over a knuckle, between knuckles, etc. Configurations in which a device such as device 10 is worn between fingers 40 may also be used. As shown by illustrative optional portions 10E and 10B, device 10 may be configured to overlap one or more joints in finger 40. This allows finger joint bending to be monitored using a bend sensor (e.g., a bend sensor in portion 10B of device 10 that measures movement of portion 10E relative to the remainder of device 10 as a user's finger bends). Portion 10B may also include haptic output devices that apply bending force to finger 40 (e.g., an electromagnetic actuator that applies forces to finger 40 that tend to bend finger 40 about the joint overlapped by device 10).

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

Figure 3:
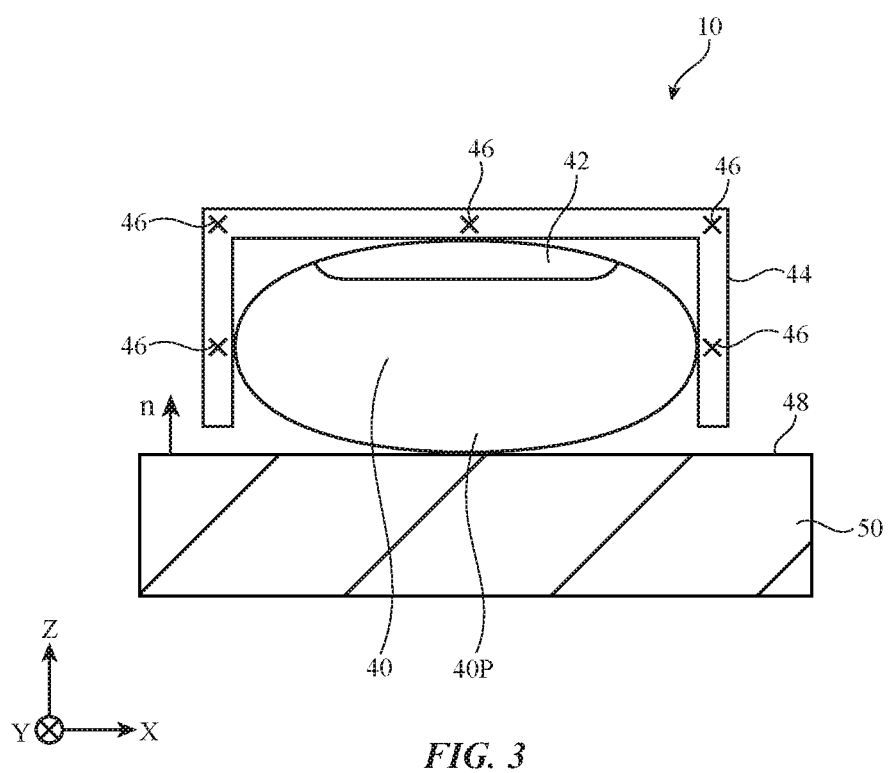
FIG. 3 is a cross-sectional side view of an illustrative finger device on the finger of a user in accordance with an embodiment.

FIG. 3 is a cross-sectional side view of an illustrative finger device (finger-mounted device) 10 showing illustrative mounting locations 46 for electrical components (e.g., control circuitry 12, communications circuitry 14, and/or input-output devices 16) within and/or on the surface(s) of finger device housing 44. These components may, if desired, be incorporated into other portions of housing 44.

As shown in FIG. 3, housing 44 may have a U shape (e.g., housing 44 may be a U-shaped housing structure that faces downwardly and covers the upper surface of the tip of user finger 40 and fingernail 42). During operation, a user may press against structures such as structure 50 (e.g., a real-world object). As the bottom of finger 40 (e.g., finger pulp 40P) presses against surface 48 of structure 50, the user's finger may compress and force portions of the finger outwardly against the sidewall portions of housing 44 (e.g., for sensing by force sensors or other sensors mounted to the side portions of housing 44). Lateral movement of finger 40 in the X-Y plane may also be sensed using force sensors or other sensors on the sidewalls of housing 44 or other portions of housing 44 (e.g., because lateral movement will tend to press portions of finger 40 against some sensors more than others and/or will create shear forces that are measured by force sensors that are configured to sense shear forces).

Ultrasonic sensors, optical sensors, inertial measurement units, strain gauges and other force sensors, radio-frequency sensors, and/or other sensors may be used in gathering sensor measurements indicative of the activities of finger 40. If desired, these sensors may also be used in mapping the contours of three-dimensional objects (e.g., by time-of-flight measurements and/or other measurements). For example, an ultrasonic sensor such as a two-dimensional image sensor or an ultrasonic sensor with a single ultrasonic transducer element may emit free-space ultrasonic sound signals that are received and processed after reflecting off of external objects. This allows a three-dimensional ultrasonic map to be generated indicating the shapes and locations of the external objects.

In some configurations, finger activity information (position, movement, orientation, etc.) may be gathered using sensors that are mounted in external electronic equipment (e.g., in a computer or other desktop device, in a head-mounted device or other wearable device, and/or in other electronic device 24 that is separate from device 10). For example, optical sensors such as images sensors that are separate from devices 10 may be used in monitoring devices 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices such as light-emitting diodes and/or lasers. The light-emitting devices may be arranged in an asymmetric pattern on housing 44 and may emit light that is detected by an image sensor, depth sensor, and/or other light-based tracking sensor circuitry in device 24. By processing the received patterned of emitted light, device 24 can determine the position, orientation, and/or motion of device 10. The positions (e.g., surface contours) of surfaces may be detected by measuring the position of device 10 when device 10 experiences a jolt, experiences a touch sensor touch event, or experiences a spike in other appropriate sensor output due to contact with the surface. The jolt may create a spike in an accelerometer output, a capacitive force sensor output, a strain gauge output, or other touch and/or force sensing circuit output in device 10. Surface contours may also be measured optically, using radio-frequency signals, using acoustic signals, etc.

If desired, finger device tracking can be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other finger device tracking arrangements may be used, if desired.

In some arrangements, user input for controlling system 8 can include both user finger input and other user input (e.g., user eye gaze input, user voice input, etc.). For example, gaze tracking information such as a user's point-of-gaze measured with a gaze tracker can be fused with finger input when controlling device 10 and/or devices 24 in system 8. The finger input may include information on finger orientation, position, and/or motion and may include information on how forcefully a finger is pressing against surfaces (e.g., force information). By monitoring finger position while also measuring touch sensor output, force sensor output, and/or output from other sensors, information may be gathered on the surface shapes of real-world objects and other real-world physical attributes. For example, if a user touches a real-world object, device 10 can detect that the user's finger has contacted the real-world object and can detect the location of the contact event, thereby mapping out the surface shape of the real-world object. In this way, surface textures, the response of an object to applied force, global surface shapes, object temperature, and other real-world object physical attributes can be obtained.

The sensors in device 10 may, for example, measure how forcefully a user is moving device 10 (and finger 40) against a real-world object surface such as surface 48 (e.g., in a direction parallel to the surface normal n of surface 48 such as the −Z direction of FIG. 3) and/or how forcefully a user is moving device 10 (and finger 40) within the X-Y plane, tangential to surface 48. The direction of movement of device 10 in the X-Y plane and/or in the Z direction can also be measured by the force sensors and/or other sensors 18 at locations 46.

Structure 50 may be a portion of a housing of device 24, may be a portion of another device 10 (e.g., another housing 44), may be a portion of a user's finger 40 or other body part, may be a surface of a real-world object such as a table, a movable real-world object such as a bottle or pen, or other inanimate object external to device 10, and/or may be any other real-world object that the user can contact with finger 40 while moving finger 40 in a desired direction with a desired force and/or any other structure that the user can measure using sensors in device 10. Because finger motions can be sensed by device 10, device(s) 10 can also be used to gather pointing input (e.g., input moving a cursor or other virtual object on a display such as a display in devices 36), can be used to gather tap input, swipe input, pinch-to-zoom input (e.g., when a pair of devices 10 is used), or other gesture input (e.g., finger gestures, hand gestures, arm motions, etc.), and/or can be used to gather other user input.

System 8 may include an optical sensor such as a gaze detection sensor (sometimes referred to as a gaze detector, gaze tracker, gaze tracking system, or eye monitoring system). A gaze tracking system for system 8 may, for example, include image sensors, light sources, and/or other equipment that is used in monitoring the eyes of a user. This system may include one or more visible and/or infrared cameras that face a viewer's eyes and capture images of the viewer's (user's) eyes. During operation of system 8, control circuitry in system 8 (e.g., control circuitry coupled to a housing in device 24) may use the gaze tracking system to track a viewer's gaze. Cameras and/or other sensors in device 24 may, for example, determine the location of a user's eyes (e.g., the centers of the user's pupils) and may determine the direction in which the user's eyes are oriented.

The orientation of the user's gaze may be used to determine the location in a computer-generated environment in which a user's eyes are directed (sometimes referred to as the user's point-of-gaze). If desired, device 24 and/or other equipment in system 8 may use gaze tracking information such as information on the user's point-of-gaze in determining which actions to take in system 8. For example, a gaze tracking system may determine that a user's point-of-gaze is directed towards a first object and not a second object and may respond by assuming that the user is visually selecting the first object and not the second object. Finger input and/or other user input may be used in combination with input such as point-of-gaze information in determining which actions are to be taken in system 8.

Figure 4:
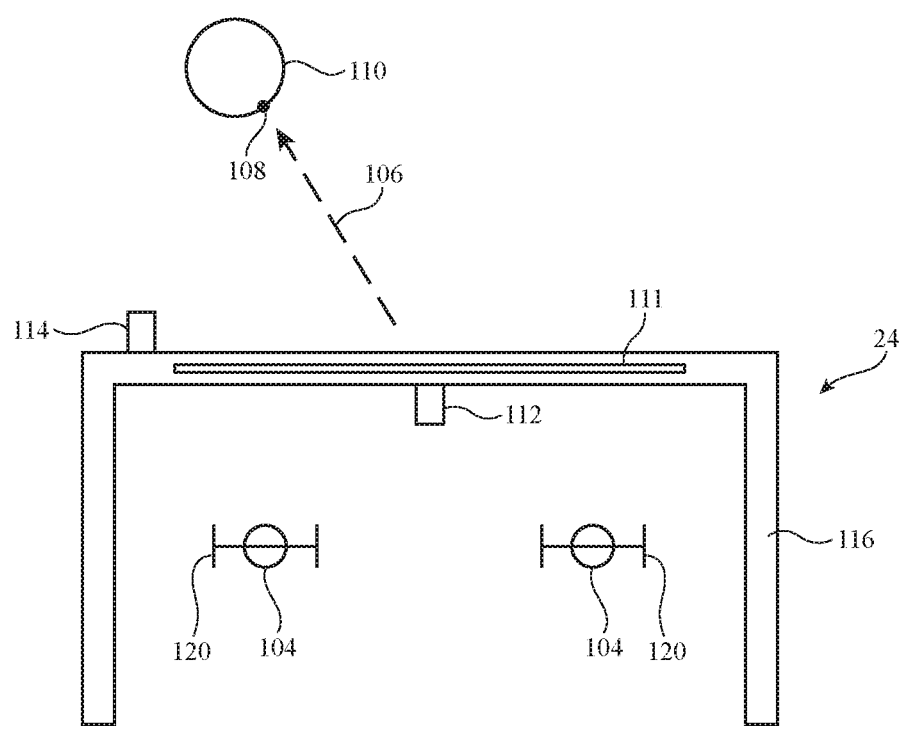
FIG. 4 is a top view of an illustrative head-mounted device having support structures configured to support a display and sensors such as a forward facing camera and gaze tracker in accordance with an embodiment.

An illustrative system with gaze tracking is shown in FIG. 4. In the example of FIG. 4, device 24 is a head-mounted device having a head-mounted support structure 116 (sometimes referred to as a housing) that is configured to be worn on the head of a user. Device 24 may include components such as component 111. Component 111 may be, for example, a display. The display and other devices may be mounted in structure 116 to display computer-generated content in eye boxes 120 for a user. Rear facing gaze tracking system 112 may monitor user's eyes 104 in eye boxes 120 to determine the direction 106 of the user's gaze. Additional sensors (e.g. depth sensor 114, which may sometimes be referred to as a three-dimensional image sensor) may be used in determining the location and/or other attributes of objects in the user's field of view such as object 110 of FIG. 4. Using direction 106 and/or other information from gaze tracker 112 and/or other sensors (e.g., a depth sensor and/or other sensors that determine the distance of the user from device 24), device 24 may determine the location of the user's point-of-gaze 108 on object 110.

Object 110 may be a real-world object (e.g., a body part of the user or other person, an inanimate object with circuitry such as one or more devices 24, a non-electronic inanimate object such as a pencil, ball, bottle, cup, table, wall, etc.) or may be a computer-generated (virtual) object that is being presented to the user's eyes 104 by a display in device 24 (e.g., a see-through display system or a display system in which virtual content is overlaid on real-world images on the display that have been captured with camera 114). Using information on the direction 106 of the user's gaze and information on the relative position between the user and object 110 (e.g., information from a depth sensor in device 24 and/or information on virtual objects being presented to the user), device 24 may determine when the user's point-of-gaze 108 coincides with object 110.

Arrangements of the type shown in FIG. 4 allow a user to interact with real-world content and computer-generated (virtual) content. For example, a user may select an object of interest by directing point-of-gaze 108 towards that object (e.g., for more than a predetermined dwell time and/or until associated user input such as finger input is received to confirm selection). Using finger device(s) 10 and/or other equipment in system 8, the user may perform operations on the selected object. During use of device 24 of FIG. 4 and/or at other times, one or more devices in system 8 (e.g., device(s) 10) may be used to gather real-world physical attributes of real-world objects. This sampled real-world information can then be presented to a user with device 24 and/or other equipment in system 8 in a computer-generated content environment.

A user may touch items in the user's surroundings while wearing finger devices 10. Measurements made with sensors in devices 10 as the user touches the surfaces of these items can be used in determining the contours of the items. This information can then be combined with optional additional sensor data such as depth sensor data, camera images, temperature data, information on the responses of objects to different amounts of applied force, surface texture data captured with one or more sensors in device 10, weight measurements, etc. to determine the physical attributes of real-world items such as size, shape, texture, location, temperature, color and other visual appearance, etc. Examples of sensors that may be used in devices 10 to measure the contours of items include inertial measurement units, which can track the orientation, position, and/or movement of devices 10 in three dimensions and force and/or touch sensors in devices 10 that can sense when a user has contacted the surface of an item. Depth sensors in devices 10 and/or 24 may also be used in gathering three-dimensional surface maps (surface contour information) for objects in the user's surroundings. If desired, input from multiple sensors (e.g., a depth sensor in a head-mounted device and a touch sensor in a finger device may be combined to enhance measurement accuracy). For example, a depth sensor may measure the shape of the front face of an object that is facing a user while finger devices may be used in measuring the shape of the opposing rear face of the object.

In general, any suitable sensors may be used in device 10 to gather information on real-world object physical attributes. These sensors may include, for example, digital image sensors (e.g., cameras operating at visible wavelengths, infrared wavelengths, and/or ultraviolet wavelengths), strain sensors, ultrasonic sensors, direct contact sensors (e.g., capacitive touch sensors, resistive force sensors, capacitive force sensors, and/or other sensors that detect applied force, optical contact sensors, and/or other sensors that detect contact between device 10 and external surfaces), thermal sensors (e.g., thermocouples, solid state temperature sensors, thermal imaging sensors, and/or other sensors that are configured to measure temperature), three-dimensional sensors (e.g., depth sensors such as structured light depth sensors that emit a set of infrared light beams and that use an infrared image sensor to measure the locations of corresponding dots projected onto nearby three-dimensional objects, binocular vision three-dimensional sensors, etc.), lidar sensors, inertial measurement unit sensors (e.g., accelerometers, compasses, and/or gyroscopes), capacitive sensors that serve as proximity sensors, force sensors, and/or touch sensors, and/or other sensors.

Figure 5:
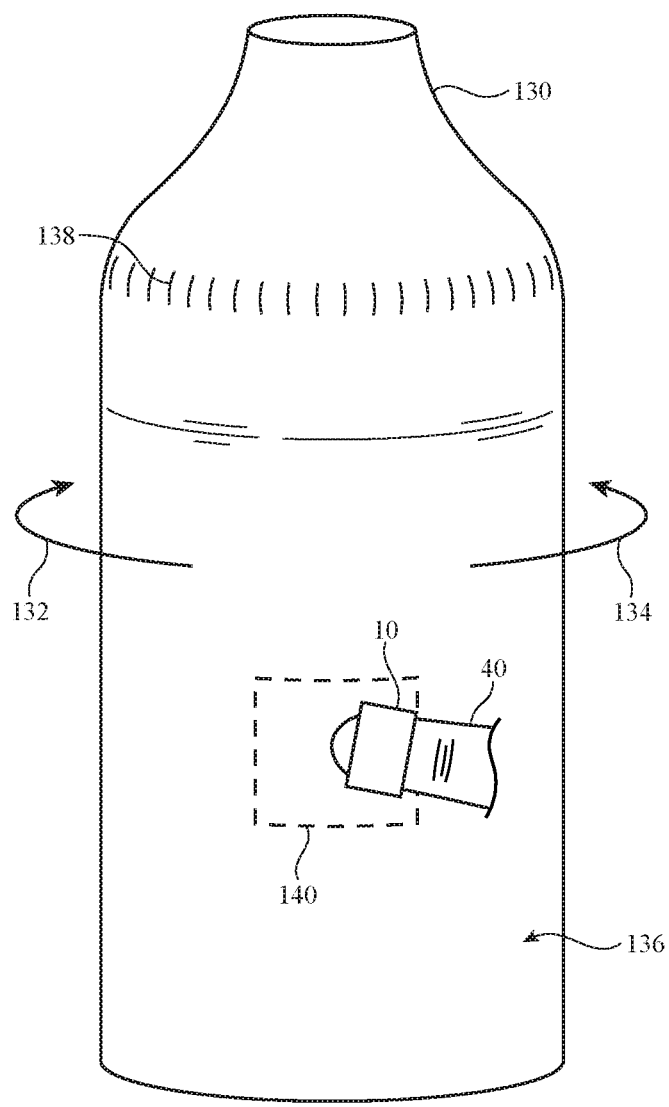
FIG. 5 is a perspective view of an illustrative real-world object with which a user is interacting while gathering measurements and/or receiving output using a finger device in accordance with an embodiment.

FIG. 5 is a perspective view of an illustrative computer-generated environment containing real-world and virtual content. In the example of FIG. 5, a user is interacting with real-world object 130 (e.g., a bottle) using finger device 10. In particular, the user is using sensors on device 10 such as touch and/or force sensors or other sensors to measure the surface of object 130. By moving the location of finger device 10 around object 130 in directions 132 and 134 while gathering sensor data from touch and/or force sensors and/or other sensors 18, finger device 10 can map out the location of the surface of object 130 in three dimensions, thereby determining the global shape and size of the exterior of object 130. Local variations in the surface of object 130 (e.g., texture, recesses, protrusions, etc.) may be sensed during these operations. For example, device 10 may determine that object 130 is smooth in location 136 and textured in location 138 (as an example).

After gathering information about the shape of object 130 and other real-world physical attributes, sampled attributes can be played back to the user using the output resources of system 8. As an example, a texture that has been sampled with a force sensor or other texture sensitive sensor in device 10 may be presented to a user using haptic output devices in device 10. The played back texture may be presented in a particular portion of the surface of a real-world object. For example, a sampled rough texture or pattern of recesses and/or grooves and/or other virtual haptic content may be presented in area 140 of smooth area 136 of object 130 (e.g., to create a texture associated with a virtual embossed label on a bottle). In addition to providing haptic output associated with virtual objects, system 8 may provide visual output, audio output, etc. For example, device 24 may overlay a computer-generated image in area 140 (e.g., an image that was captured during real-world-object attribute sensing operations on a real-world object with device 10 or other virtual content). Device 24 may overlay images on real-world objects by displaying these objects in a head-mounted device, by projecting content onto objects using a display projector, and/or by otherwise overlaying computer-generated images.

Sounds may also be presented in association with computer-generated objects. For example, device 10 may capture information on the sound of running finger 40 across a rough fabric. The sampled sound can then be played back to the user with speakers in device 24 as the user's finger moves across area 140. If desired, haptic output may also be presented to a user with device(s) 10 while the user's fingers are located in the air and are not directly contacting real-world-objects.

If desired, a temperature sensor in device 10 may be used to measure the temperature of a real-world object. During operation of system 8, sampled temperatures may be recreated for the user using a thermoelectric device or other device for providing a desired temperature output (e.g., resistive heating elements, etc.). Sampled real-world object physical attributes such as temperature may be gathered for each location on a real-world object that is touched by finger 40. Interpolation techniques may be used to fill in missing temperature samples and/or other real-world attribute measurements.

Sampled real-world-object physical attributes may be stored in a local or online library for later retrieval and use by the user or others. For example, a user may obtain information on a texture and the contour of an object from a shared online library. This information may have been collected and placed in the library by someone other than the user. During operation of the user's system 8, the user's system 8 may use information on the contour of the object and/or other real-world object physical attributes of the object in presenting virtual content to the user (e.g., in presenting virtual content including computer-generated haptic output, visual output, temperature output, audio output, etc.).

As an example, knowing the locations of the surfaces of a real-world cube that were sampled and uploaded to an online library by someone other than the user, the user's system 8 can overlay virtual visual content on one or more virtual cube surfaces and can provide corresponding virtual haptic output to the user's fingers 40 using haptic output devices in finger devices 10 to simulate a sampled texture for those surfaces whenever system 8 determines that the user's fingers are touching the virtual cube.

If desired, different surfaces of the cube or other object can be provided with different virtual textures using the haptic output devices. As an example, circuitry in device 10 can supply a first drive signal with a relatively high amplitude and frequency whenever the user's fingers are touching a first side of the cube. Whenever the user's fingers are determined to be touching a second side of the cube, a different texture can be supplied to the user's fingers with the haptic output components in finger devices 10. As an example, if the user touches the second side of the cube, a lower-frequency and lower-magnitude drive signal can be used to control the haptic output components in finger devices 10. As a result, the user will feel a first texture when touching the first side of the cube and a second texture when touching a second side of the cube. If desired, cubes and other objects can be provided with haptic effects along their edges to create sharp and/or rounded edges, can be provided with haptic effects associated with compliant structures, and/or can be provided with detents, force-feedback simulating motion resistance, clicks simulating depression and/or release of a button with a physical click sensation, and/or other haptic effects. Corresponding visual effects can also be provided using a display in a head-mounted device.

FIGS. 6, 7, 8, and 9 show how device 10 may use sensors 18 to gather real-world-object physical attributes from surface 48 of a real-world object such as structure 50.

Figure 6:
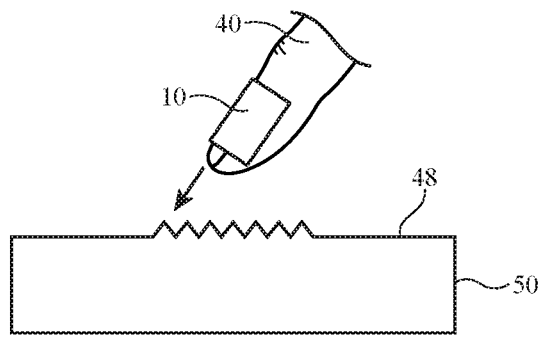
FIGS. 6, 7, 8, and 9 are diagrams showing how illustrative finger devices may be used in gathering measurements on real-world objects in accordance with an embodiment.

In the example of FIG. 6, a non-contact sensor is being used to sense surface 48 of a real-world object such as structure 50. The non-contact sensor may be, for example, a laser-based sensor that emits laser light and that uses a corresponding photodetector to monitor reflected portions of the laser light, thereby measuring surface 48. Other sensors 18 (e.g., a three-dimensional structured light sensor or other three-dimensional sensor, a two-dimensional image sensor, a radio-frequency sensor, an acoustic sensor such as an ultrasonic sensor, and/or other non-contact sensor) may also be used in gathering measurements of the physical attributes of surface 48 (e.g., color, texture, contour shape, etc.).

Figure 7:
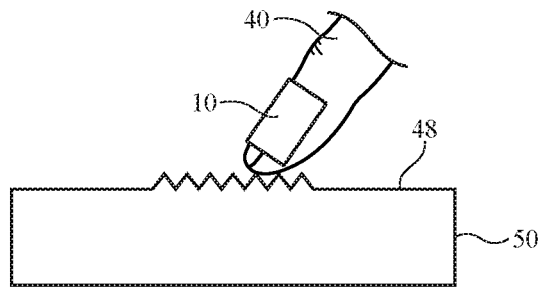

In the example of FIG. 7, device 10 is being used to gather information on structure 50 using an indirect contact arrangement. In this type of arrangement, the housing walls and other structures of device 10 do not directly contact surface 48, but rather gather information on surface 48 by virtue of the contact between finger 40 and surface 48. If, as an example, a user moves finger 40 across a textured portion of surface 48, an inertial measurement unit (e.g., an accelerometer, etc.) or other sensor 18 in device 10 can sense corresponding vibrations in finger 10 that reveal the texture. In this way, device 10 can gather information on the shape of surface 48 and its response to pressure from finger 40, even if device 10 does not come into direct contact with surface 48 during physical attribute measurement operations.

Figure 8:
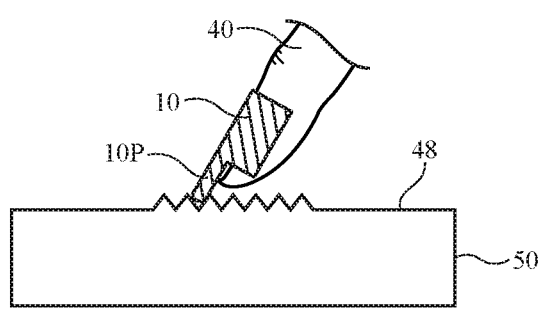

Another illustrative arrangement for sampling physical attributes associated with structure 50 is shown in FIG. 8. In the example of FIG. 8, device 10 (e.g., the housing of device 10) has a protruding portion such as protrusion 10P. Protrusion 10P extends past the outermost tip of finger 40, which allows device 10 to use protrusion 10P to directly contact surface 48 and thereby sample physical attributes such as surface texture (e.g., using a force sensor based on a strain gauge in protrusion 10P or using an inertial measurement unit (e.g., an accelerometer, etc.). The sensor may measure the texture by measuring movement of device 10 relative to structure 50 as finger 40 drags protrusion 10P and therefore device 10 across the surface of structure 50.

Figure 9:
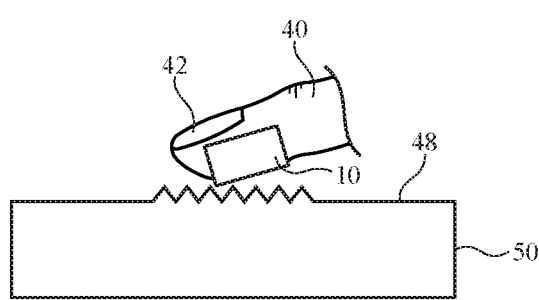

In the example of FIG. 9, the user has moved device 10 so that device 10 temporarily covers the user's finger pad. Device 10 may be, for example, a U-shaped finger device that is sometimes worn on the upper side of finger 40. When configured as shown in FIG. 9, device 10 may directly contact surface 48 as the user measures physical attributes associated with surface 48 and structure 50. During subsequent haptic playback to recreate the sampled texture, device 10 may be worn in the finger-pad-covering configuration of FIG. 9 or the configuration of FIG. 6 or 7 in which the user's finger pad is exposed.

Figure 10:
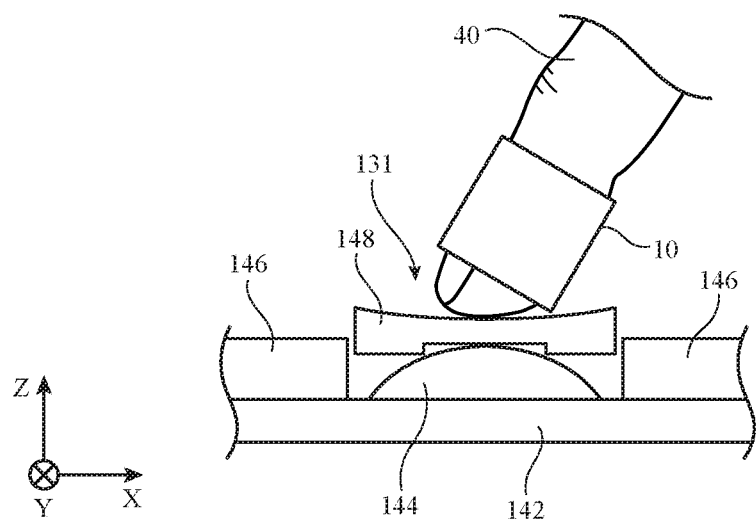
FIG. 10 is a diagram of a real-world object with a movable mechanism such as a button that is being measured using an illustrative finger device in accordance with an embodiment.

Sampled real-world objects may be inanimate objects without mechanical mechanisms or circuitry (e.g., an object such as a bottle, etc.) or may be a button with a movable button member or other device with a movable mechanism and/or circuitry (e.g., a keyboard, a mouse button, etc.). In the example of FIG. 10, the real-world object being sampled is button 131 (e.g., an alphanumeric key or other button in an electronic device). During operation of button 131, user input such as button press input may be gathered from finger 40 of a user. When it is desired to sample the physical attributes of button 131, device 10 may be worn on user finger 40 while user finger 40 moves over the surface of button 131 (to measure the surface contours of button 131) and while finger 40 depresses button 131.

As shown in FIG. 10, button 131 may have a dome switch such as switch 144 mounted on printed circuit 142. Guide structures 146 may help guide movable button member 148 along the vertical (Z axis) dimension as the user presses and releases moveable button member 148. When movable button member 148 is pressed downward, button member 148 compresses dome switch 144 against printed circuit 142. When button member 148 is released, dome switch 144 pushes button member 148 upward. By monitoring the state of switch 144 in button 131, the electronic device in which button 131 is operating may detect the state of button 131 (e.g., open or closed). At the same time, by using the sensors in device 10, the force-versus-distance behavior (force-versus-displacement characteristic) of button 131 and other information on button 131 (e.g., size, shape, color, etc.) may be gathered, allowing system 8 to replicate the performance of button 131 in a computer-generated environment.

Figure 11:
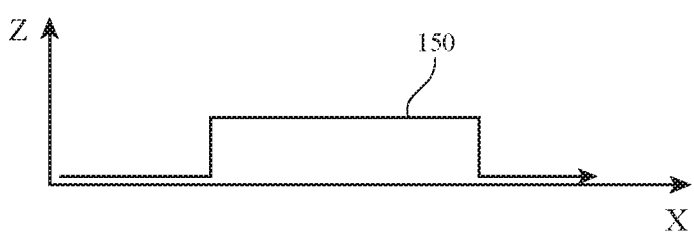
FIGS. 11 and 12 are graphs of illustrative measured attributes associated with the movable mechanism of FIG. 10 in accordance with an embodiment.

FIG. 11 is a graph showing how a user may use device 10 to gather physical attribute information on button 131 of FIG. 10 such as information on the shape of button 131. A user may, for example, move finger 40 across button 131 in direction X while lightly touching the surface of button 131. An inertial measurement unit or other position sensor in device 10 may measure the position of the user's finger in vertical dimension Z and horizontal dimension X as the user moves finger 40 to different positions across button 131. By gathering this position information (see, e.g., curve 150 of FIG. 11), device 10 may determine the shape of the surface of button 131.

Figure 12:
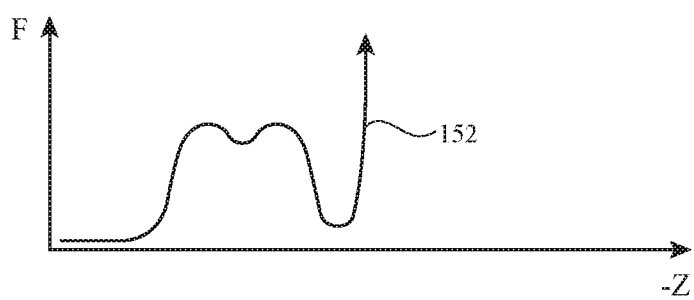

FIG. 12 is a graph showing how device 10 may gather physical attribute information such as information on the response of button 131 to various levels of applied force. A user may, for example, press against button member 148 in a downward (−Z) direction while a position sensor measures the position of device 10 along dimension Z and a force sensor measures the corresponding amount of force F being applied. This allows device 10 to gather information on the force-versus-button-depression-distance behavior of button 131 (see, e.g., curve 152 of FIG. 12). The sampled physical behavior of button 131 can then be replayed to a user in a computer-generated environment by using haptic devices in device(s) 10 to recreate the sampled behavior of applied force on device 10 and finger 40 as a function of displacement.

Sampling may be performed by squeezing an object or by otherwise using one or more fingers such as finger 40 to apply pressure to the surface of a physical object (e.g., as a user picks up an object, pushes in a particular direction against the object with finger 40, etc.). The amounts of pressure (force) applied and the locations and directions of the applied pressures (forces) may be gathered by device 10 during sampling. These measurements may then be analyzed to determine surface shape, surface rigidity (e.g., response under pressure including response force amount and response force direction) and other attributes. If a movable electronic component such as button 131 is present, the response of the button to various levels of applied force may be gathered as described in connection with FIGS. 10, 11, and 12. If no button is present, information may be gathered on the location and pressure response of the object's surface. Sampled attributes may then be played back for a user during use of system 8 (e.g., directional haptic waveforms may be applied to haptic output devices to recreate a force in a desired direction or other directional haptic output, etc.).

If desired, a microphone in device 10 may gather acoustic measurements (e.g., button click sounds) when button 131 is being used and a speaker in device 24 or other equipment in system 8 may replay the captured sounds for the user (e.g., computer-generated sampled sounds can be used in a computer-generated environment to recreate the sonic experience of interacting with a real-world button). By sampling buttons and other equipment associated with an office environment (e.g., computer keyboards, etc.), system 8 may recreate a virtual version of a user's office or other equipment with mechanical movable structures. If desired, the behavior of circuits and other components that include other physical attributes (e.g., devices that exhibit particular optical properties, acoustic properties, thermal properties, odors, and/or mechanical properties, etc.) may be sampled and presented to a user in a computer-generated environment.

If desired, textures, surface shapes, visual appearances, temperatures, acoustic properties, and other real-world-object attributes may be edited. For example, one or more individuals may use one or more different pieces of electronic equipment (see, e.g., device 10, device 24, etc.) to gather measurements of real-world-object physical attributes and these sampled physical attributes may then be cut-and-pasted and/or otherwise edited to create a desired environment.

Figure 13:
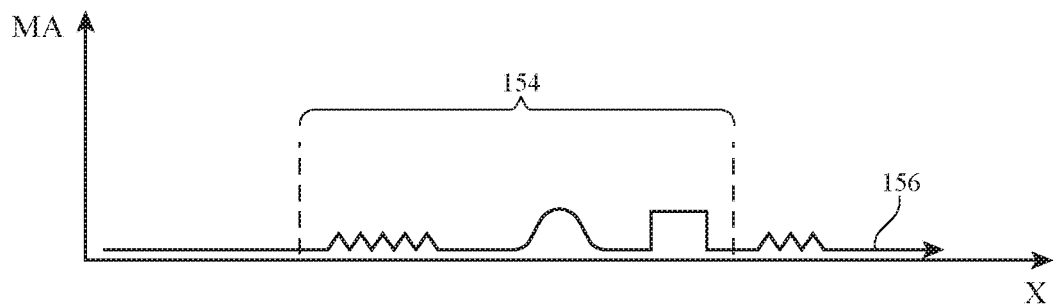
FIGS. 13, 14, and 15 are graphs showing how real-world-object attributes may be measured on a real world object and cut-and-pasted or otherwise incorporated into an environment with real and virtual content in accordance with an embodiment.
Figure 14:
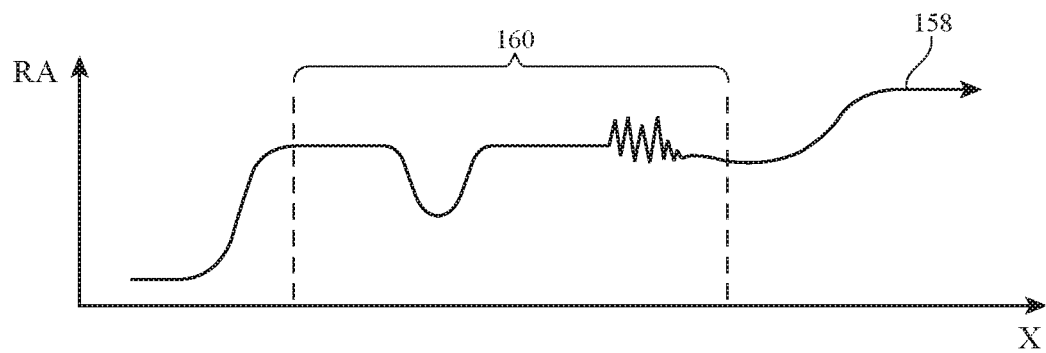
Figure 15:
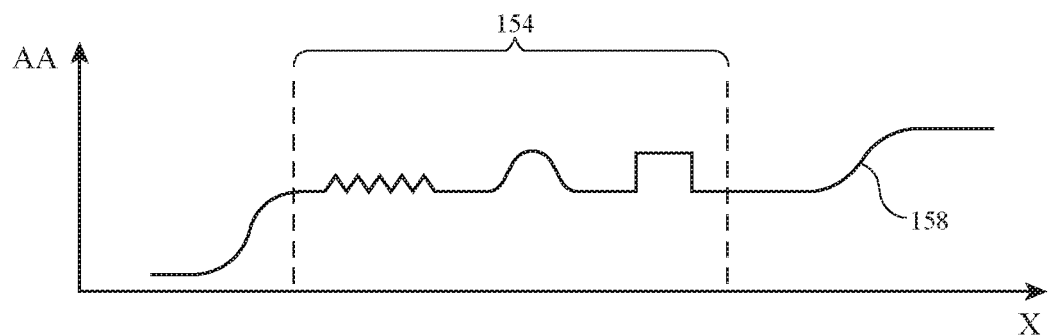

Consider, as an example, the illustrative arrangement of FIGS. 13, 14, and 15.

FIG. 13 is a graph of a measured physical attribute MA as a function of distance X (e.g., distance along the surface of a real-world object being measured). In the example of FIG. 13, a user has moved finger 40 and device 10 laterally across the surface of a real-world object. Physical attribute MA has been measured by device 10 as a function of distance X. As shown in FIG. 13, curve 156, which corresponds to measured physical attribute MA includes portion 154, which is of interest for subsequent use in a computer-generated environment. Physical attribute MA may correspond to physical surface position (surface contour), temperature, an optical property such as reflectivity, color, etc., local position (texture), rigidity (e.g., deformation amount under pressure), resistance force (e.g., the amount and/or direction of resistance to one or more different amounts of force applied in a particular direction), and/or other physical attribute of a real-world object that is being measured.

FIG. 14 is a graph showing the real-world attribute RA of a real-world object. The real-world object associated with attribute RA of FIG. 14 may be an object other than the real-world object that is associated with the graph of FIG. 13. In this example, illustrative measured attribute MA of FIG. 13 has been measured on a first real-world object, whereas illustrative real-world attribute RA of FIG. 14 is associated with a second real-world object that is different than the first real-world object.

FIG. 15 shows how a computer-generated environment may include a sampled portion of the first object that is being played back to the user with the haptic devices of finger device 10 and/or the display and acoustic devices of device 24 and/or other equipment in system 8. As shown in FIG. 15, virtual output associated with sampled portion 154 of the first real-world object may be overlaid over the second real-world object associated with curve 158. The portion of the second real-world object that has been overlaid by the sample of portion 154 of the first real-world object may be obscured due to the sample of portion 154. For example, the visual, haptic, acoustic, and other attributes of the first real-world object in portion 154 may obscure underlying visual, haptic, acoustic, and other attributes in portion 160 of the second real-world object. The portion of the second real-world object that is not overlapped by the recreated first object (see, e.g., curve 158 of FIG. 15 in the region other than portion 154) may be directly sensed by the user. For example, the first object may be a piece of fabric with a texture and color that is of interest to a user. This texture and color may be sampled using device 10 and overlaid on a given portion of a second object such as a bottle. When the user interacts with the bottle, the texture and color of the fabric may replace the bottle's normal characteristics in the given portion of the bottle, whereas other portions of the bottle may have the bottle's original texture and color.

Sampled physical attribute cutting-and-pasting operations of the type described in connection with FIGS. 13, 14, and 15 may be performed by a user and/or by others. Sampled content that is to be incorporated into a computer-generated environment may be selected from a shared online library and/or from a user's personal library. Sensor information such as information that a user gathers with device 10 may be shared with others using the online library subject to the user's permission and/or other safeguards. If desired, cut-and-pasted attributes may include response force (e.g., information on the amount of resistance experienced by finger 40 in response to applying a given amount of force in a given direction at a given location). Haptic output can be used to recreate response force feedback that simulates user interaction with a sampled real-world object. In this way, real-world resistance forces (responses to applied forces) may be cut-and-pasted into virtual environments. In scenarios in which temperature measurements are sampled, cut-and-pasted temperature readings can be merged into virtual environments. In scenarios in which finger bending forces are measured during user interactions with real-world objects (e.g., using a finger bending sensor in portion 10B of device 10 of FIG. 2), finger bending characteristics can be cut-and-pasted into a virtual environment. During use of system 8, the user may experience recreated temperatures, finger bending forces, and other physical attributes based on the sampled physical attributes.

Figure 16:
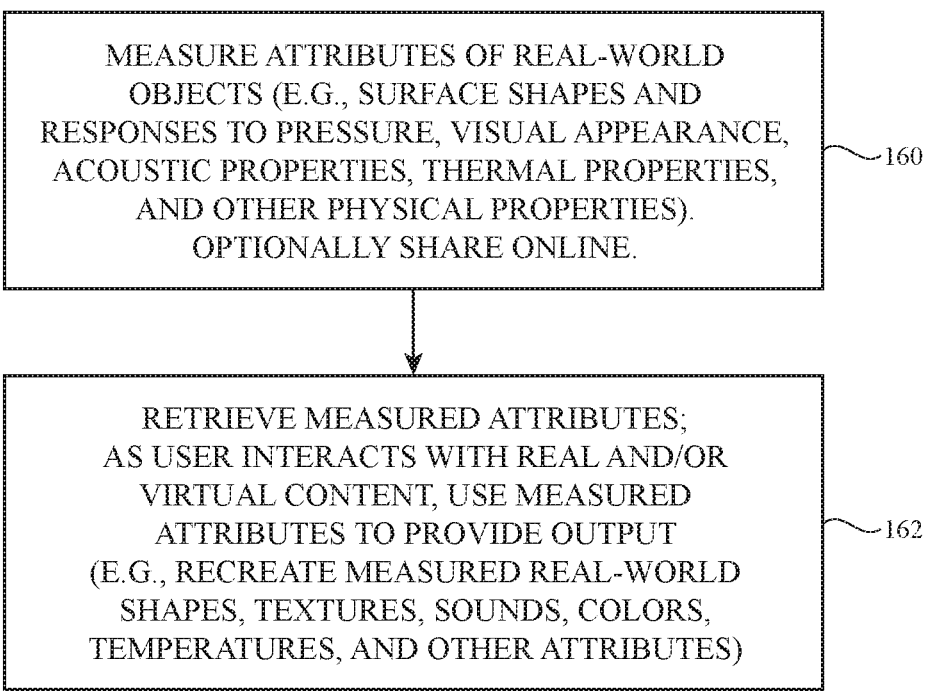
FIG. 16 is a flow chart of illustrative operations associated with operating a system with electronic devices in accordance with an embodiment.

FIG. 16 is a flow chart of illustrative operations that may be associated with using system 8.

During the operations of block 160, the real-world-object physical attributes of physical objects may be measured using sensors 18 in device 10 and/or other sensors in system 8 as a user and/or others interact with real-world objects. The real-world objects may include inanimate objects without moving parts, buttons and other objects that have mechanical mechanisms that move in response to finger pressure and/or other applied forces, electronic circuitry (e.g., a touch sensitive device), and/or other real-world objects.

Sensors 18 and/or other sensors in system 8 may measure surface contours (e.g., some or all of the overall (global) shape of the surface of an object), may measure local surface attributes (e.g., texture, localized protrusions and/or grooves, etc.), may measure optical characteristics (e.g., color, visual pattern, reflectivity, absorption, and transmission at visible, infrared, and/or ultraviolet light wavelengths), electrical properties (radio-transparency, frequency resonances, surface and interior structures associated with the absorption, reflection, and/or transmission of electromagnetic signals at non-light wavelengths), acoustic attributes, resilience (e.g., stiffness, flexibility, elasticity, hardness, and/or other material attributes), weight, torque under various usage conditions (e.g., torque on a user's fingers when a wand or baseball bat is being swung back and forth), friction (e.g., a coefficient of static friction or a coefficient of dynamic friction as measured by a shear force sensor in device 10), force-versus-displacement (force-versus-distance) behavior (e.g., change in surface location and/or other attributes as a function of applied finger pressure or other applied force), etc.

Information that is gathered during the operations of block 160 may, if permitted by a user, be shared by uploading this information to an online database. Configurations in which sampled information is stored locally or is otherwise not shared with others may also be used. If desired, different electronic devices and/or different types of electronic devices may be used in gathering the information during the operations of block 160 than are used by users in playing back this information during use of system 8. Arrangements in which the same type of device and/or the same electronic device is used in both sampling and playing back information may also be used.

The real-world objects that are sampled during the operations of block 160 may include household objects (cups, bottles, furniture, clothes, and other items), may include office equipment (computers, keyboards, accessories such as computer mice, etc.), may include video game equipment (e.g., prop swords or wands), may include sports equipment (e.g., rackets, balls, pucks, clubs, bats, sticks, and/or other sports equipment), and/or other real-world objects.

During the operations of block 162, system 8 (e.g., device 10 and device(s) 24) may provide output to create a computer-generated environment. The output may include output corresponding to the real-world-object physical attributes that were measured during the operations of block 160 (e.g., sampled information may be played back for a user). For example, the computer-generated environment may include surface shapes, textures, object colors and other visual appearance attributes, sounds, force-versus-displacement characteristics and other moving mechanisms characteristics, weights, temperatures, and/or other real-world-object physical attributes that were measured using device 10, device(s) 24, and/or other electronic equipment with sensors and that are being presented to the user using device(s) 10 and/or device(s) 24. Measured attributes may be retrieved from local storage and/or from cloud storage (e.g., an online library that is accessed through a communications network with local and/or remote links formed using wireless and/or wired communications paths). Recreated physical object attributes can be overlaid on real-world objects. For example, a sampled texture may be recreated on a portion of a bottle or other real-world object, thereby replacing the real-world attributes of the object with the sampled attribute(s). If desired, recreated physical object attributes can be recreated in free space (e.g., as a user's fingers are moving through the air). Visual content may be overlaid on real-world objects by displaying computer-generated images in a head-mounted device or other device that displays computer-generated content on top of real-world images and/or by projecting visual content onto real-world objects using a projector (e.g., a projector in device 10 and/or a projector in device 24). A user may provide user input using finger devices 10 and/or other devices 24. For example, a user may provide user input such as a swipe gesture input using a finger device and this input may be used to move a virtual object displayed in computer-generated content that is being viewed by the user with a display in a head-mounted device. The haptic output and other output in the computer-generated environment that is presented based on sampled real-world-object physical attributes may be presented to the user as the user is using a finger device or other device to provide user input. For example, haptic output or other output based on sampled real-world-object weight characteristics may be provided as a user is moving a virtual object with a finger device.

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented Reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, organic light-emitting diodes (OLEDs), LEDs, micro-LEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
a finger device housing configured to be coupled to a finger of a user, wherein the finger device housing is configured to leave a finger pad at a tip of the finger uncovered when the finger device housing is coupled to the finger;
a sensor coupled to the finger device housing that measures a real-world-object physical attribute, wherein the real-world-object physical attribute comprises a surface texture of a real-world object that is measured with the sensor while the finger pad contacts the real-world object; and an output device configured to provide output to recreate the measured surface texture.

2. A system, comprising:
a finger device housing configured to be coupled to a finger of a user, wherein the finger device housing is configured to leave a finger pad at a tip of the finger uncovered when the finger device housing is coupled to the finger;
a sensor coupled to the finger device housing that measures a real-world-object physical attribute; and
an output device configured to provide output to recreate the measured real-world-object physical attribute, wherein the sensor comprises an inertial measurement unit coupled to the finger device housing, wherein the real-world-object physical attribute comprises a surface texture of a real-world object that is measured with the inertial measurement unit, wherein the output device comprises a haptic output device coupled to the finger device housing, and wherein the haptic output device is configured to provide haptic output to the finger based on measurements of the surface texture made with the inertial measurement unit.

3. The system defined in claim 2 further comprising a head-mounted device with a display that is configured to display an image.

4. The system defined in claim 3 wherein the display is configured to move a virtual object in the displayed image in response to user input obtained from the sensor.

5. The system defined in claim 2 further comprising a projector that is coupled to the finger device housing and that is configured to project an image onto a surface.

6. The system defined in claim 5 wherein the projector is configured to move a virtual object in the image on the surface in response to user input obtained from the sensor.

7. The system defined in claim 1 wherein the sensor comprises an image sensor.

8. The system defined in claim 1 wherein the sensor comprises a sensor selected from the group consisting of: a strain gauge, an ultrasonic sensor, a direct contact sensor that senses a surface by directly contacting the surface, a temperature sensor, a light detection and ranging sensor, an accelerometer, a gyroscope, a compass, and a capacitive sensor.

9. A system, comprising:
a finger device housing configured to be coupled to a finger of a user, wherein the finger device housing is configured to leave a finger pad at a tip of the finger uncovered when the finger device housing is coupled to the finger and wherein the finger device housing has a protrusion configured to extend past the tip of the finger when the finger device housing is coupled to the finger;
a sensor coupled to the finger device housing that measures a real-world-object physical attribute; and
an output device configured to provide output to recreate the measured real-world-object physical attribute.

10. The system defined in claim 1 wherein the output device comprises a haptic output device, wherein the real-world-object physical attribute comprises a surface contour of a real-world object, and wherein the haptic output device is configured to recreate the surface contour of the real-world object as the finger is moved through air without contacting any real-world objects.

11. The system defined in claim 1 wherein the output device comprises a haptic output device coupled to the finger device housing, and wherein the haptic output device is configured to provide haptic output to the finger based on measurements of the surface texture with the sensor.

12. A system, comprising:
a finger device housing configured to be coupled to a finger of a user;
a sensor coupled to the finger device housing that measures a real-world-object physical attribute, wherein the sensor comprises a three-dimensional optical sensor configured to project dots of infrared light onto three-dimensional surfaces of real-world objects; and
an output device configured to provide output to recreate the measured real-world-object physical attribute.

13. The system defined in claim 1 further comprising an adjustable temperature source.

14. A system, comprising:
a head-mounted device with a display configured to display computer-generated content in eye boxes;
a finger device housing that is configured to be worn on a finger having a finger pulp, wherein the finger device housing has a protrusion configured to extend past the tip of the finger when the finger device housing is coupled to the finger;
a sensor coupled to the finger device housing that is configured to measure a real-world-object physical attribute of a real-world object while the finger pulp is in direct contact with the real-world object; and
a haptic output device coupled to the finger device housing, wherein the haptic output device is configured to provide haptic output to the finger based on the measured real-world-object physical attribute as the finger device housing provides user input that moves an object in the computer-generated content.

15. The system defined in claim 14 wherein the sensor comprises an accelerometer.

16. The system defined in claim 14 wherein the sensor comprises a sensor selected from the group consisting of: a force sensor and a touch sensor.

17. The system defined in claim 14 wherein the sensor comprises an optical sensor.

18. The system defined in claim 14 wherein the sensor comprises an image sensor.

19. A system, comprising:
a head-mounted device with a display configured to display computer-generated content in eye boxes;
a finger device housing that is configured to be worn on a finger;
a sensor coupled to the finger device housing that is configured to measure a real-world-object physical attribute of a real-world object;
a haptic output device coupled to the finger device housing, wherein the haptic output device is configured to provide haptic output to the finger based on the measured real-world-object physical attribute as the finger device housing provides user input that moves an object in the computer-generated content; and
computing equipment configured to maintain an online library of measured real-world-object physical attributes, wherein the haptic output device is configured to provide haptic output to the finger based on a measured real-world-object physical attribute retrieved from the online library.

20. A method, comprising:
with a head-mounted device having a display, presenting computer-generated visual content in eye boxes;
while presenting the computer-generated visual content, providing haptic output using a haptic output device in a finger device configured to be worn on a finger, wherein the haptic output is based on a measured surface contour of a real-world object; and while presenting the computer-generated visual content, providing audio using a speaker, wherein the audio includes a sampled sound measured by the finger device.

21. The method defined in claim 20 further comprising:
with a sensor in the finger device, measuring the surface contour of the real-world object.

22. A method, comprising:
with a head-mounted device having a display, presenting computer-generated visual content in eye boxes;
while presenting the computer-generated visual content, providing haptic output using a haptic output device in a finger device configured to be worn on a finger, wherein the haptic output is based on a measured surface contour of a real-world object; and
with a sensor in the finger device, measuring the surface contour of the real-world object, wherein the sensor comprises an accelerometer and wherein measuring the contour comprises measuring the contour of the surface using the accelerometer while a finger pad portion of a tip of the finger is uncovered by the finger device.

23. A method, comprising:
with a head-mounted device having a display, presenting computer-generated visual content in eye boxes;
while presenting the computer-generated visual content, providing haptic output using a haptic output device in a finger device configured to be worn on a finger, wherein the haptic output is based on a measured surface contour of a real-world object;
with a sensor in the finger device, measuring a force-versus-displacement characteristic associated with the real-world object; and
while presenting the computer-generated visual content, using the haptic output device to provide haptic output that is based on the measured force-versus-displacement characteristic.

* * * * *